Feb. 21, 1961     L. E. DALY     2,972,593
VULCANIZED SHOE SOLE CONTAINING BUTADIENE
STYRENE COPOLYMERS AND GRAFT COPOLYMER
Filed Nov. 10, 1955     3 Sheets-Sheet 1

Fig. 1

TYPICAL STEPS IN NEW METHOD OF MAKING CASUAL SHOES (1) MAKE RESIN-REINFORCED RUBBER COMPOSITION BY MIXING:

(A) 100 parts GR-S RUBBER (B) 15-60 parts GRAFT POLYMER RESIN (C) 0-30 parts HIGH STYRENE - LOW BUTADIENE RESIN
    sum of (B) and (C) equalling 30-60 parts and (C) never being greater than (B)

(D) 10-200 parts INORGANIC FILLER (E) VULCANIZING INGREDIENTS (2) SHEET MIX TO SHOE SOLE THICKNESS BY CALENDERING OR EXTRUDING (3) DIE SHOE SOLES OUT OF UNVULCANIZED SHEET (RETURN SCRAP TO (2))

(4) ASSEMBLE UNVULCANIZED SOLES WITH FABRIC AND UNVULCANIZED RUBBER PARTS TO FORM SHOES (5) VULCANIZE SOLES AND OTHER VULCANIZABLE PARTS OF SHOES SIMULTANEOUSLY WITHOUT MECHANICAL CONFINEMENT, OBTAINING SHOE WITH SMOOTH, UNDISTORTED, HARD, LEATHER-LIKE SOLE.

INVENTOR.
LAWRENCE E. DALY
BY *James J. Long*
AGENT

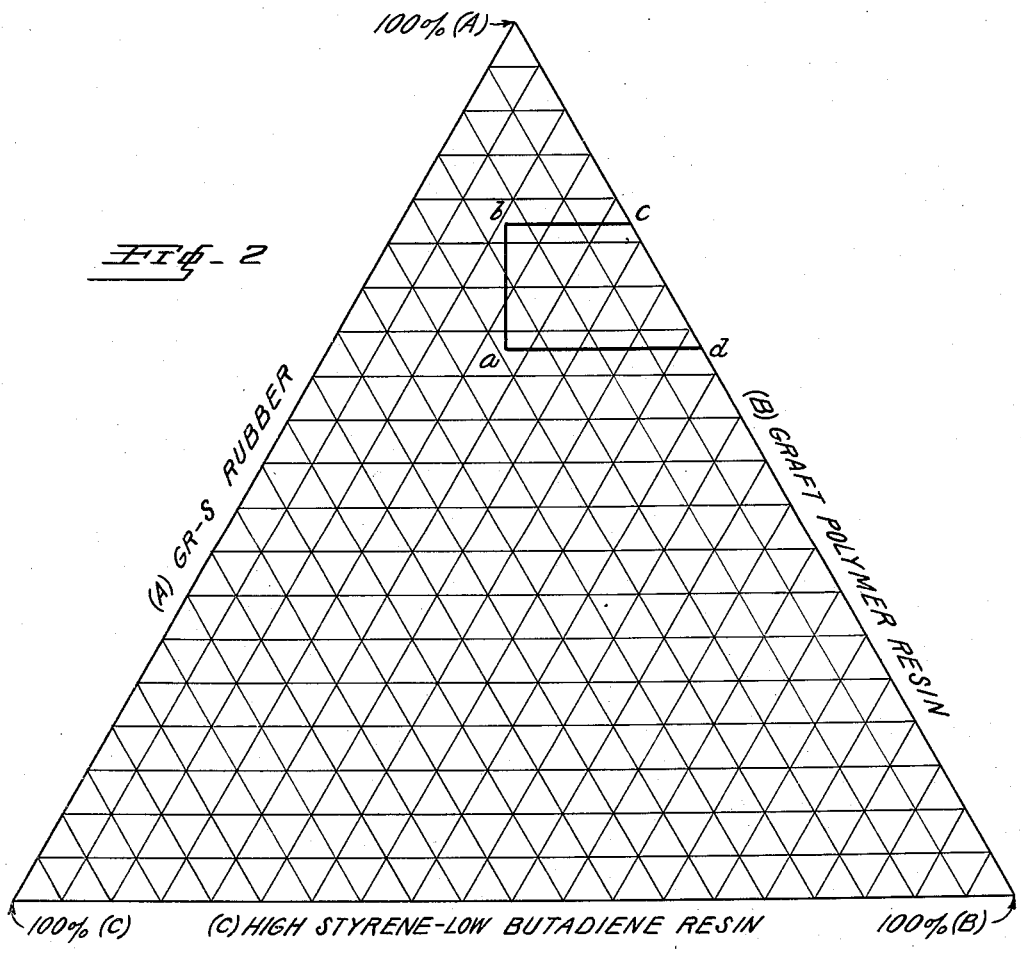
TERNARY DIAGRAM OF RESIN-REINFORCED SOLING COMPOSITION.
COORDINATES (% BY WEIGHT)
| INGREDIENTS: | (A) | (B) | (C) |
|---|---|---|---|
| POINT | | | |
| a | 62.5 | 18.75 | 18.75 |
| b | 76.9 | 11.5 | 11.5 |
| c | 76.9 | 23.1 | 0. |
| d | 62.5 | 37.5 | 0. |
INVENTOR.
LAWRENCE E. DALY
BY James J. Long
AGENT Feb. 21, 1961 L. E. DALY 2,972,593
VULCANIZED SHOE SOLE CONTAINING BUTADIENE
STYRENE COPOLYMERS AND GRAFT COPOLYMER
Filed Nov. 10, 1955 3 Sheets-Sheet 3
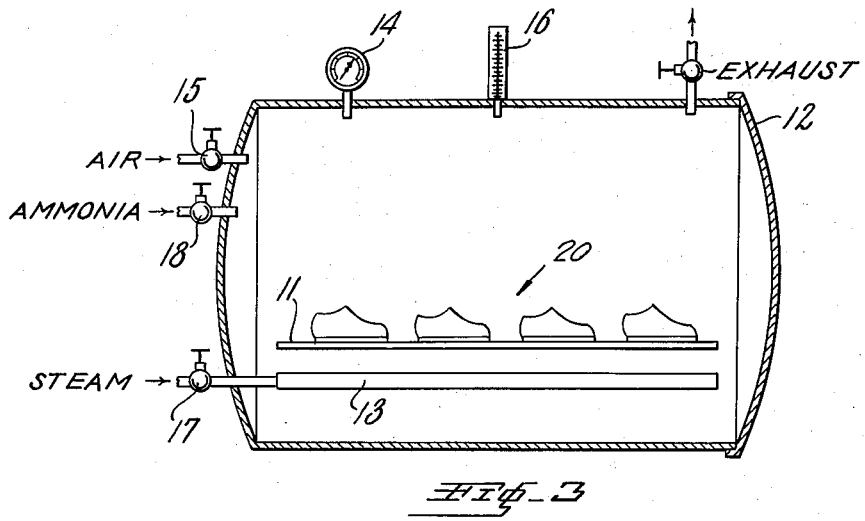
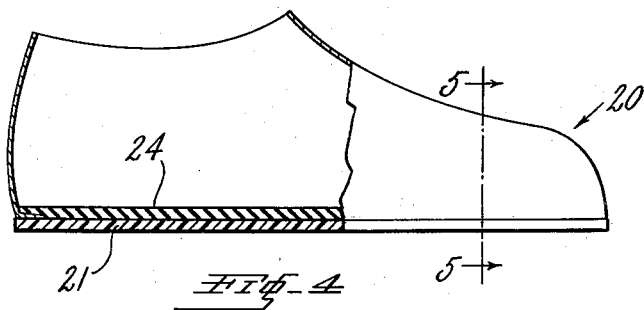
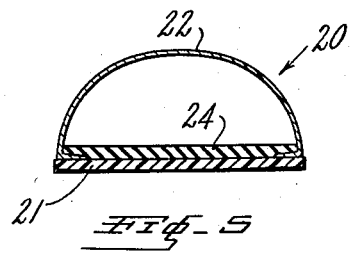
INVENTOR.
LAURENCE E. DALY
BY *James J. Lung*
AGENT

United States Patent Office 2,972,593
Patented Feb. 21, 1961

2,972,593

VULCANIZED SHOE SOLE CONTAINING BUTADIENE STYRENE COPOLYMERS AND GRAFT COPOLYMER

Lawrence E. Daly, South Bend, Ind., assignor to United States Rubber Company, New York, N.Y., a corporation of New Jersey Filed Nov. 10, 1955, Ser. No. 546,125

2 Claims. (Cl. 260—41.5)

This invention relates to an improved shoe soling composition, and to a method of making shoes, especially fabric and rubber casual shoes, having soles made of such composition. More particularly, the invention relates to a composition for shoe soles and the like comprising (A) a major proportion of a rubbery material composed at least a large part of the butadiene:styrene copolymer type of synthetic rubber (known as "GR–S"), and (B) a minor proportion of a graft copolymer-containing portion which is based on a graft copolymer composition obtained by polymerizing styrene and acrylonitrile onto previously prepared polybutadiene or GR–S (a supplementary amount of separately prepared styrene-acrylonitrile copolymer resin optionally being added) and, optionally, (C) a further quantity of a resin which is a high styrene-low butadiene copolymer.

The invention is an improvement on the conventional shoe soling compositions based on a major proportion of GR–S rubber and a minor proportion of high styrene-low butadiene resin. Such conventional mixtures are used to produce hard, leather-like shoe soles. Soling compositions based upon these mixtures of resin-reinforced GR–S have replaced leather to a large extent because they are less expensive than leather, much longer wearing than leather, more flexible than leather, and unaffected by water, and have the attractive appearance and feel of top grade oak leather soles.

However, the conventional shoe soling compositions of resin-reinforced GR–S have a serious disadvantage in that they are required to be pressed or otherwise positively confined in precisely the desired thickness and shape while they are being vulcanized. If the composition of resin-reinforced GR–S is not pressed or similarly mechanically confined against an unyielding surface during vulcanization, the shoe sole is distorted, lumpy and misshapen. In practice, this has required that the raw, vulcanizable rubber-resin composition be shaped into the form of a sheet of suitable thickness, which is then vulcanized while it is pressed under confinement, either batchwise in a platen press or continuously in a rotary drum-and-band type of press. Afterwards, the desired shoe soles or similar parts are die-cut from the vulcanized sheet and applied to the shoes by cementing or sewing. This procedure is necessary because it is not practical to press and vulcanize the individual shoe soles after they have been cut from an unvulcanized sheet of resin-reinforced GR–S rubber, and hence it is necessary in practice first to vulcanize the sheet of resin-reinforced rubber under confinement, and subsequently to cut the shoe soles out of the sheet of the rubber-resin blend, as indicated.

The procedure involving vulcanizing the sheet of rubber-resin mixture and later cutting the shoe soles from the vulcanized sheet gives rise to a considerable economic waste, since the scrap remaining after the soles are cut from the vulcanized sheet cannot be re-used, in the manner that thermoplastic or unvulcanized scrap can be.

Accordingly, it is a principal object of the present invention to provide an improved shoe soling composition, from which the shoe soles or the like can be cut out in the unvulcanized state, thereby making it possible to re-cycle or re-use the waste portions, to the economy of the whole operation.

Another object is the provision of a shoe soling composition which can be vulcanized without being positively confined in a press, and which still provides the proper shape as well as a desirable smooth surface appearance.

Still another object of the invention is the provision of a more convenient and more economical method of making shoes, in which the soles or other parts of the shoes are made from a plastic material cut from an unvulcanized sheet, and subsequently vulcanized without being pressed or similarly confined, to provide a hard, leather-like sole.

It is also an object of the invention to produce shoe soles (in which term I hereafter include equivalent parts such as heels and lifts) by the method described, for sale as such to other manufacturers or to shoe repairers who apply such soles and the like to new or to old shoes.

A further object is the provision of a shoe soling composition and method which is especially adapted to the manufacture of the casual type of shoe including vulcanizable rubber portions in the uppers or other parts, wherein the sole of the shoe and the other vulcanizable rubber parts are vulcanized simultaneously in a single curing operation.

The manner in which the invention attains the foregoing as well as additional objects and advantages will be made manifest in the following detailed exposition, which may be read with reference to the accompanying drawings, wherein:

Fig. 1 is a flow diagram representing a preferred method of practicing the invention;

Fig. 2 is a graphical representation, on triangular co-ordinates, of the compositions of the invention;

Fig. 3 is a sectional elevational view of an oven containing shoes of the invention in process of being cured;

Fig. 4 is longitudinal elevational view, with parts broken away and parts shown in section, of a shoe having a sole made of the composition of the invention; and, Fig. 5 is a transverse sectional view taken along line 5—5 of Fig. 4.

The invention is based on the surprising discovery that homogeneous, processible shoe soling compositions having a unique community of properties can be obtained by replacement of a substantial portion or all of the high styrene-low butadiene resin (of the conventional resin-reinforced GR–S soling composition) with resinous graft copolymer-containing portion (B) based on a graft copolymer made by polymerizing a mixture of monomeric styrene and monomeric acrylonitrile onto the rubber particles of emulsion-polymerized rubbery polybutadiene or GR–S. In another aspect, the invention is based on the utilization of such an improved composition in an unobvious series of steps leading to the formation of a shoe sole of good quality and pleasing appearance, or to the formation of a casual shoe, including rubber and canvas footwear, bearing such sole. More particularly, the invention in one aspect is based on the unexpected discovery that the novel soling composition of the kind referred to can be formed into a smooth sheet by extrusion or calendering or any other siutable method, and shoe soles or similar shapes can be die-cut or otherwise cut out of such sheet in unvulcanized form, after which the shoe soles or the like can be vulcanized without positive, mechanical confinement in a press or the like, to yield a hard, leather-like shoe sole having precisely the desired shape and a smooth, pleasing surface appearance that is free from lumps or roughness.

In practicing my invention, I prepare the shoe soling mixture in accordance with any procedure suitable for mixing rubbery and resinous materials, as by the use of an open roll mill or by the use of an internal mixer. As indicated previously, the rubbery constituent (A) forms the major part of the essential polymeric ingredients of the mixture. The rubbery material (A) is preferably solely GR–S rubber, although I may replace up to 25% of the GR–S with natural Hevea rubber with satisfactory results. The GR–S requires no special description here, since it is a well-known commercial type of synthetic rubber obtained by copolymerizing butadiene and styrene in aqueous emulsion, either at moderately elevated temperatures ("hot" GR–S) or at low temperatures ("cold" GR–S). The GR–S conventionally contains from 60 to 95% or more of the butadiene and correspondingly from 40 to 5% or less of the styrene.

With each 100 parts of the rubbery constituent (A) there is admixed, according to my invention, as a kind of reinforcement, from 15 to 60 parts of the resinous graft copolymer-containing portion (B) comprising basically a graft copolymer of styrene and acrylonitrile on polybutadiene or GR–S. The graft copolymer composition is made by first providing a latex or dispersion of emulsion-polymerized butadiene or GR–S, adding thereto monomeric styrene and acrylonitrile, and resuming the polymerization operation with the result that styrene and acrylonitrile are grafted onto the polybutadiene or GR–S copolymer, that is, at least part of the styrene and acrylonitrile become actually attached by primary chemical bonds to the previously formed molecules of polybutadiene or GR–S. In order to adjust the ratio of total styrene-acrylonitrile components to rubber component in the resinous graft-containing portion (B) to the desired value, a supplement of separately prepared styrene-acrylonitrile copolymer resin may thereafter be added to the graft copolymer, if necessary. The graft copolymer composition is characterized by the fact that extraction thereof with solvents capable of dissolving styrene-acrylonitrile resin will not remove all of the styrene-acrylonitrile content of the graft copolymer composition, the true graft copolymer being that portion of the composition which is insoluble in said solvents. The graft copolymer composition contains, besides the true graft copolymer, more or less of styrene-acrylonitrile copolymer resin soluble in said solvent. The graft copolymer per se is thus uniquely distinguished from the "series" or "piggy-back" type of polymers in which a separate polymer is formed in the presence of a previously prepared polymer, without any chemical interaction between the first polymer and the added polymer components, so that each polymer is fully separable from the other by preferential extraction.

The resinous graft-containing portion (B) contains [in 100 parts of (B)] 20 to 75 parts of the emulsion-polymerized synthetic rubber (polybutadiene or GR–S) and correspondingly 80 to 25 parts of polymerized styrene and acrylonitrile, some substantial portion of the styrene and acrylonitrile being grafted onto the synthetic rubber, thus altering profoundly the character of the rubber. In the resinous portion (B), the added styrene and acrylonitrile, in whatever polymeric forms, are present in proportions, relative to each other, of from about 25% to less than 90% of styrene (based on the combined weights of styrene and acrylonitrile) and correspondingly from about 75% to more than 10% of acrylonitrile. At least a quarter of the polymerized styrene and acrylonitrile in the resinous portion (B) must have been introduced as styrene and acrylonitrile monomers in admixture with the latex of the polybutadiene or GR–S and have been polymerized in said latex so that at least some of the styrene and acrylonitrile are grafted onto the synthetic rubber.

It is important, in order to obtain a true graft copolymer that the amount of dispersing agent should be maintained, during the grafting reaction, at not more than 5 parts (generally 1 to 5 parts) per 100 parts of synthetic rubber and added styrene and acrylonitrile, until at least one-half of the styrene and acrylonitrile monomer mixture to be polymerized in the synthetic rubber latex has actually been converted to polymer.

As above stated, at least 25%, of the styrene acrylonitrile resin in the final resinous portion (B) must have become polymerized in the synthetic rubber latex. The remainder of the styrene-acrylonitrile resin in the resinous portion (B) may be separately prepared by copolymerization of styrene and acrylonitrile in aqueous emulsion in the conventional manner, and later added to the graft copolymer. Such supplementary styrene-acrylonitrile resin can be mixed in latex form with the graft copolymer latex and the mixed latices coagulated. Alternatively, the supplement of styrene-acrylonitrile resin, in dry form, can be mixed on a mill or in an internal mixer with the dried graft copolymer. The ratio of styrene to acrylonitrile in the emulsion for preparing the resin separately may be the same as or different from the ratio of styrene to acrylonitrile in the monomer mixture which is polymerized in the synthetic rubber latex, provided that both ratios are within the above-mentioned range of 25 to less than 90% styrene and correspondingly 75 to more than 10% (e.g., 11%) of acrylonitrile.

A typical method of making a graft copolymer suitable for use in the resinous portion (B) in practicing my invention is as follows:

Polybutadiene latex is provided in the form of a commercially available preparation known as GR–S 2004. This latex contains about 58% solids. A suitable latex of this kind may be prepared in known manner by polymerizing a butadiene emulsion at about 65° C. in the presence of a small amount of persulfate catalyst and initially in the presence of 1 part of soap per 100 parts of monomer, followed by the addition of 2 more parts of soap during the course of the polymerization. An amount of such polybutadiene latex equivalent to 50 parts of solid polybutadiene is charged to an autoclave equipped with an agitator and equipped with means for adding further ingredients in the course of the graft polymerization. A solution of 150 parts water, 0.05 part of sodium hydroxide, and 0.5 part of potassium persulfate is then charged to the autoclave. The temperature is then raised to 140° F. A mixture of 34 parts of monomeric styrene and 16 parts of monomeric acrylonitrile is then charged to the autoclave slowly at such a rate as to maintain the temperature in the range of about 130°–165° F., without additional external heating, or without external cooling of the autoclave. Simultaneously, a solution of 30 parts of water, 2 parts of sodium soap of disproportionated rosin and 0.03 part of sodium hydroxide is charged continuously to coincide with the monomer addition. Normally, the reaction will proceed at a satisfactory rate after a short induction period, but if the reaction has not started when about 30% of the mixed monomers have been added, the addition of monomers and soap solution is to be stopped and the batch held at a temperature of 140° F. by external heating until the reaction does start, as evidenced by a spontaneous increase in temperature. The pH of the system should be maintained at about 9.5 or slightly above, by adjustment of the sodium hydroxide content if necessary. The reaction proceeds to a conversion of about 95% within a reaction cycle of about 6 to 8 hours. The resulting latex contains the graft copolymer per se, as well as some separately formed (i.e., nongrafted) styrene-acrylonitrile binary copolymer resin.

To produce the complete resinous portion (B) containing supplementary resin, there is separately prepared a styrene-acrylonitrile resin latex as follows:

70 parts of styrene and 30 parts of acrylonitrile are mixed with 200 parts of water, 2 parts of an alkyl aryl sulfonate emulsifying agent (Nacconol NRSF), 0.3 part of potassium persulfate, 0.01 part of sodium bisulfite, 0.35 part of mixed ($C_{12}$–$C_{16}$) tertiary alkyl mercaptan.

and 75–125 parts of a mineral filler, together with small amounts of compounding ingredients, including a vulcanizing agent.

In another typical embodiment of my invention, I formulate in the manner set forth in the preceding paragraph, except that I use 20 parts of the graft copolymer composition in conjunction with 20 parts of a high styrene-low butadiene resinous copolymer. Such compositions are readily extruded or calendered into smooth sheets of shoe outsole thickness (e.g., 0.01 to 0.3 inch).

In the detailed description above of preparing the resinous graft-containing portion (B) it will be recalled that all of the styrene and acrylonitrile could be graft copolymerized in the rubber latex, or only a part (at least one-quarter) of the styrene and acrylonitrile could be so graft copolymerized, in which case the remaining styrene and acrylonitrile would be added as separately prepared styrene-acrylonitrile resin. It is desired to point out now that such separately prepared styrene-acrylonitrile resin need not necessarily be added as part of ingredient (B), but it may if desired be added instead to the rubber (A), or to the styrene-butadiene resin (C), or to the mixture of (A), (B) and (C) at any suitable stage in the mixing. In general, the ingredients (A), (B) and (C), as well as the separately prepared styrene-acrylonitrile resin (if any), may be mixed in any desired order.

The following examples will serve to illustrate my invention in more detail. All parts and percentages in this specification and in the appended claims are expressed by weight.

EXAMPLES

Stock 1 (representing prior art compounding) and stocks 2, 3, 4 and 5 (representing my invention) the formulations of which are given in Table I were mixed in the conventional manner using a Banbury mixer (step 1 of Fig. 1). The resulting stocks were extruded directly onto a sheet 0.120 inch thick (step 2 of Fig. 1). In order to determine the physical properties of vulcanizates of these stocks, samples of the resulting sheets were press-cured for ten minutes at 313° F. (except for stock 5, which was cured without pressing as noted below). The abrasion resistance, flex-resistance and hardness of the resulting stocks, compared to a sample of a commercial hard shoe soling material sold under the trade name "Neolite," were measured. The data on stocks 1–4 are given in the lower portion of Table I.

Table I

| Stock | 1 | 2 | 3 | 4 | 5 |
|---|---|---|---|---|---|
| (A) GR-S 1006 (Note 1) | 100 | 100 | 100 | 100 | 100 |
| (B) "Cycolac" | | 40 | 20 | | 25 |
| (B) Resinous graft-containing portion (Note 4) | | | | 40 | |
| (C) High styrene-low butadiene resin (Note 2) | 40 | | 20 | | 25 |
| "Zeolex 23" (filler) | 65 | 100 | 100 | | 88 |
| "Suprex" clay (filler) | 15 | 15 | 15 | | 13 |
| "Hi-Sil" (filler) | | | | 115 | |
| Zinc oxide | 3 | 3 | 3 | 3 | 3 |
| Neville resin R-16 (Note 3) | 7.5 | 7.5 | 7.5 | 7.5 | 9.5 |
| Stearic acid | 2 | 2 | 2 | 2 | 2 |
| "Altax" (benzothiazyl disulfide) (accelerator) | 2 | 2 | 2 | 2 | 2 |
| "DOTG" (di-ortho-tolylguanidine) (accelerator) | 2 | 2 | 2 | 2 | 1.2 |
| Sulfur | 2.5 | 2.5 | 2.5 | 2.5 | 2.5 |
| Color pigments | | | | | 11 |
| Paraffin wax | | | | | 3.7 |
| Agerite Stalite (antioxidant) | | | | | 1.5 |
| Extruded as a 0.120" thick sheet | Rough | Smooth | Smooth | Smooth | |

| Stock | 1 | 2 | 3 | 4 | 5 | Commercial "Neolite" |
|---|---|---|---|---|---|---|
| Taber abrasion #18 wheels, 1,000 cycles: | | | | | | |
| Weight loss | 1.1014 | 1.1912 | .7033 | .3707 | | .7823 |
| Gauge loss | .0098 | .0093 | .006 | .004 | | .005 |
| Di Mattia flexing (50,000 cycles) | OK | OK | OK | OK | | OK |
| Shore "A" Hardness | 88 | 90 | 89 | 85 | | 95 |

NOTES
1. Commercial butadiene-styrene rubbery copolymer, so-called "hot" GR-S.
2. A copolymer of 86% styrene and 14% butadiene.
3. Coumarone-indene resin.
4. Made in manner described in detail above.

The data reported in Table I indicate that my graft copolymer-reinforced stocks not only extrude very smoothly but also have physical properties as good as or better than those of a vulcanizate made from Stock 1 which was prepared in accordance with typical practice prior to my invention. The graft copolymer-reinforced stocks are also as good as or better than the commercial shoe soling material known as "Neolite." It is desired to emphasize especially that stock 1, which was based upon the high styrene-low butadiene resin (C) only as the resinous reinforcing agent, definitely could not be extruded smoothly enough to be used on footwear of the type which is built before being vulcanized. In fact, it was absolutely impossible to cut satisfactory shoe soles out of the uncured sheet of stock 1, and as a practical matter shoe soles could be made out of this stock only by first vulcanizing it in a press, and thereafter cutting out the shoe soles.

Stocks 2–4 of the invention were press cured simply for the purpose of providing cured material for use in obtaining the physical properties thereof, but it will be understood that the prime advantage of these stocks is that they do not require press curing to adapt them for attachment to other vulcanizable parts in an unrestrained cure process. These properties are illustrated by the data in Table II, below, wherein are shown the results obtained by curing stock 5 of Table I in air or in an atmosphere of ammonia, without any pressing.

Table II

NON-PRESS CURES OF STOCK 5

| | Tensile Strength (p.s.i.) | Elongation (percent) | Hardness (Shore "A") | Tabor Abrasion (Gauge Loss) |
|---|---|---|---|---|
| Air Cure | 1,330 | 313 | 92 | .011 |
| Ammonia Cure | 1,100 | 228 | 91 | .009 |

The mixture is agitated for four hours at 50° C., giving 100% conversion.

An amount of the graft copolymer latex, equivalent to 65 parts of solid graft copolymer, is mixed with an amount of the styrene-acrylonitrile resin latex equivalent to 35 parts of the solid styrene-acrylonitrile resin. If desired, one or two parts of a conventional anti-oxidant is also added, before or after blending the latices. The mixed latices are then coagulated (co-precipitated) by adding dilute formic acid, or calcium chloride solution, or other coagulant, preferably at a flocculation temperature of about 180° F. The dried crumb may be used as such, compression moldings thereof being found to have a Rockwell hardness of 77-87 on the R scale, and a notched-Izod impact strength of at least 5 foot-pounds at room temperature. Or, the dried crumb may be blended further with conventional ingredients such as anti-oxidants, lubricants, and the like.

An alternative type of graft copolymer which can be used in the practice of my invention is the material sold commercially under the name "Cycolac." "Cycolac" has the character of a graft copolymer made by grafting styrene and acrylonitrile onto polybutadiene or GR-S in latex form. A typical sample of "Cycolac" has the following properties:

| | |
|---|---|
| Specific gravity | 1.01. |
| Rockwell hardness | 90. |
| Tensile strength | 4500 pounds per sq. inch. |
| Modulus of elasticity | 196,000. |
| Compression set | 0-00, 22 hours at 158° F. |
| Brittleness temperature | −45° F. |
| Heat distortion temperature | 200° F. |
| Demolding temperature | 212-220° F. |

In general, the polybutadiene or GR-S rubber on which the styrene and acrylonitrile monomers are grafted may be defined as a rubbery polymer of butadiene with from 0 to 40% of styrene (based on the combined weight of butadiene and styrene).

Turning now to the additional resinous ingredient (C) of the soling composition, this is the known high styrene-low butadiene resin (i.e., containing from about 75 to less than 90% of styrene and correspondingly from about 25 to more than 10% of butadiene), which may be prepared in aqueous emulsion by conventional polymerization methods requiring no detailed description here. The resin (C) is employed in the soling composition in amount of from 0 to 30 parts, per 100 parts of the rubbery ingredient (A), subject to the condition that the sum of the two resinous components (B) and (C) be equal to from 30 to 60 parts, per 100 parts of the rubber (A). It is further required that, in any case, the amount of the styrene-butadiene resin (C) be less than or equal to, but never greater than, the resinous graft-containing portion (B). The required proportions of the materials constituting the polymeric ingredients of the present soling mixture may be summarized as follows:

| | Parts | Percent of A+B+C |
|---|---|---|
| (A) GR-S (containing if desired 0-25% natural rubber, on the total weight of GR-S and natural rubber) | 100 | 62.5-77 |
| (B) Resinous portion based on graft copolymer (polybutadiene or GR-S to which styrene-acrylonitrile resin is grafted, with or without additional separately prepared styrene-acrylonitrile resin) | ¹15-60 | ²12-37.5 |
| (C) High styrene-low butadiene resin (optional) | ¹0-30 | ²0-18.75 |

¹ Such as to total 30-60 (C≯B).
² Such as to total 23-37.5 (C≯B).

When the proportions of the ingredients are as specified in the foregoing table, the composition will provide the properties required for the present purposes, but if these specifications are departed from significantly, the desired results are not obtained. The foregoing requirements are represented graphically in Fig. 2, wherein the irregular polygon bounded by the coordinates a, b, c, d repesents the compositions of the invention.

Since it is necessary for purposes of the invention to vulcanize the shoe sole or similar part of the shoe made of the present composition (such vulcanization to be carried out after the unvulcanized sole or similar part is assembled in the shoe), I add to the composition conventional compounding ingredients in conventional amounts sufficient to vulcanize the mixture. I typically employ suitable quantities of accelerators, activators, and vulcanizing agents, such as sulfur, sufficient to cure the mixture to a soft-vulcanized state.

In practice, I also typically include in the soling composition a suitable quantity (from 10 to 200 parts per 100 parts of the rubbery component (A)) of a filler, usually a mineral filler. Examples of fillers which have given very good results are a hydrated sodium silicoaluminate filler (such as that sold under the trade name "Zeolex 23"), precipitated hydrated silica (such as those materials sold under the trade name "Hi-Sil"), precipitated hydrated calcium silicate (such as is sold under the trade name "Silene EF"), and clay. If desired, two or more fillers can be used in combination.

I prefer to include in the shoe soling composition of my invention a relatively small amount of a coumarone-indene resin. The amount of such optional resin will usually be equal to from 5 to 10 parts per 100 parts of the rubbery component (A), and although this optional material does not change the basic character of the composition, it does function as a low cost extender, as well as a plasticizer for the GR-S.

The composition can include any desired pigmenting material intended to give any desired color effect to the product. In this respect, the present composition is definitely superior to previously employed compositions, as far as presenting more attractive coloring possibilities is concerned. The components of the present composition are in general of light texture, so one can consider coloration which approaches the pastel shades. Furthermore, the present composition need not be exposed to the severe temperature environments necessary with the conventional soling material, i.e., the estimated top extrusion die temperatures for the present material are in the neighborhood of 285° F. for only a few seconds as the material passes through the extruder head, while the conventional material requires temperatures of over 300° F. for a period of time in the neighborhood of five minutes, because the conventional material is so much more difficult to process. If the conventional material is to be colored, more expensive, heat stable pigments are required, and the process is not economical. Also, the ability to re-use the trim scrap in the present process makes it practical to supply a wide variety of colors, as each batch can be almost entirely consumed.

In a modification of the invention the composition can if desired contain a chemical blowing agent of any known type, in which case it can be blown to expanded closed-cell form using techniques known to the art. Such blowing will almost invariably be carried out during processing to effect vulcanization. For example, the two-stage technique of making closed-cell expanded rubber-containing materials shown in U.S. Patent to Cuthbertson, 2,291,213, issued July 28, 1942, can be used. Thus, it is feasible to sheet out the unvulcanized mixture containing the blowing agent, to expand this and vulcanize it in the manner shown by Cuthbertson, and to cut from the resulting sheet outsoles which can be incorporated in shoes by conventional methods.

In a typical embodiment of my invention, I employ a uniform intimate mixture of 100 parts of GR-S, 40 parts of resinous portion (B) containing graft copolymer, The "air cure" was carried out by placing the sheet of stock 5 in an unconfined condition on a shelf of an air oven. The temperature was raised to 270° F. over a period of 1 hour. The air pressure in the oven was brought to 20 p.s.i. and the temperature was held at 270° F. for 1½ hours. The "ammonia cure" was similarly carried out, except that after a 1 hour rise to 250° F., 20 pounds of ammonia (5% of the volume of the vulcanizing oven) was added. Air pressure in the oven was then brought to 20 p.s.i. and the cure was continued at 250° F. for 1½ hours. In both cases, the oven was then allowed ½ hour to cool down.

Outsole blanks were died out (this corresponds to step 3 of the accompanying flow sheet, Fig. 1), from unvulcanized sheets of stocks 2, 3, 4 and 5 and were assembled by conventional procedure with unvulcanized rubber and fabric parts in shoes which were then vulcanized at a temperature of 250° F. in an oven (such as the oven 12 in Fig. 3) under an air pressure of 30 pounds per square inch gauge. Such temperature and pressure may be observed on a thermometer 16 (Fig. 3) and pressure gauge 14, respectively, provided on the oven. The oven may be heated by a steam heater 13, regulated by a steam inlet valve 17. Other valves 15 and 18 provide for introduction of air or ammonia, respectively. Such shoes may be assembled (step 4 of Fig. 1) by otherwise conventional procedures well understood by those skilled in the art of making shoes and they may be otherwise of conventional construction, as shown for example in Figs. 4 and 5 of the drawings, wherein an illustrative shoe 20 is represented with a sole 21 formulated in accordance with the invention and with a fabric upper 22 atached thereto in any conventional manner (e.g., by cementing and/or sewing). Representative other vulcanizable parts of the shoe may include for example the usual conventional vulcanizable soft rubber insole 24 (optional). The soles were vulcanized simultaneously with the rest of the shoe [this step corresponds to step 5 of Fig. 1, and may be carried out, for example, by placing the shoe 20 (Figs. 4 and 5) on the shelf 11 (Fig. 3) of the oven 12] and the vulcanized soles were perfectly smooth and free of distortion. In the inventor's experience, such smooth, undistorted appearance in a resin-reinforced rubber sole stock that was not previously vulcanized in a press is unprecedented. The oven cure or unconfined cure just described is also sometimes referred to as an open cure or as an air cure (the air sometimes being replaced in whole or in part by steam or ammonia, or other gases or vapors).

From the foregoing description, many advantages of my invention will be apparent to those skilled in the art. In one aspect, an important advantage is that it enables the shoe soles (including heels or lifts) to be die-cut out of an uncured sheet, so that the scraps and trim can be re-used (step 3 of Fig. 1), instead of requiring the sheet to be first press cured, which precludes re-use of scrap and trim. Thus, the invention makes possible maximum economy in the use of the material, as well as further economy resulting from the elimination of the costly press curing operation itself. The invention is more readily adaptable to essentially continuous operation, whereas the requirements of the conventional resin-reinforced rubber soling compositions were such that a batch-wise operation, with many hand operations, was almost a matter of necessity. The invention for the first time makes it feasible and economical to provide a hard sole on the rubber and canvas casual type of shoe that is built before it is cured. In prior practice, it was feasible only to provide soft rubber soles on such shoes by the usual factory practice, because the hard rubber-resin sole could not be vulcanized on these pre-built shoes, and still give acceptable appearance. Now, for the first time insofar as the inventor is aware, the pre-built casual fabric and rubber type of shoe can be provided with a hard sole, vulcanized on the shoe at the same time as the vulcanized rubber parts of the shoe are cured. In connection with one actual factory installation, it was estimated that the use of the graft copolymer resin to replace some or all of the conventional resin reinforcement of the soling composition, as described, made it possible to effect a 45% saving in the cost of manufacture of casual shoe soles.

Another advantageous way of practicing the invention involves sheeting out, by extrusion or calendering, the vulcanizable composition, cutting shoe soles and the like (e.g. heels and lifts) therefrom (re-using the trim scrap), vulcanizing the cut out soles in an oven without pressing or otherwise mechanically confining them, and selling the resulting well-formed, undistorted shoe soles to shoe manufacturers or shoe repairers. It will be appreciated that this would not be feasible or economical with conventional resin-reinforced rubber soling compositions. If the soles were cut out of a conventional unvulcanized sheet, the soles would have to be vulcanized individually in presses, which would be impractical, otherwise the soles would become distorted and lumpy during vulcanization. On the other hand, if the sheet were vulcanized in a press before cutting out the soles, the scrap could not be re-used (aside from the expense of the press curing).

The described composition is also useful for making other items, such as brief cases, wallets, and leather-like coverings for automobile crash pads.

Having thus described my invention, what I desire to protect by Letters Patent is:

1. A hard, smooth shoe sole consisting of a sheet having the size and shape of a shoe sole, said sheet being comprised of a vulcanized uniform intimate mixture of (A) butadiene-styrene copolymer rubber containing from about 60 to about 95% by weight of butadiene and from about 40 to about 5% by weight of styrene both based on the total weight of said copolymer, (B) a graft copolymer-containing portion comprising by weight (1) 20 to 75 parts of a rubber portion selected from the group consisting of polybutadiene and copolymers of butadiene with up to 40% styrene, and (2) correspondingly 80 to 25 parts of a styrene-acrylonitrile resin containing from 25 to less than 90% of styrene and correspondingly from 75 to more than 10% of acrylonitrile, at least a quarter of said styrene-acrylonitrile resin (2) in said graft copolymer-containing portion (B) having been introduced as the monomers into a pre-formed latex of said rubbery portion (1), and polymerized therein, whereby there is formed a graft copolymer of the styrene and acrylonitrile on the said rubber portion (1) and (C) a resinous copolymer consisting of 86% by weight of styrene and 14% by weight of butadiene, the relative proportions of (A), (B) and (C) being 100 parts by weight of (A), 20–25 parts by weight of (B), and 20–25 parts by weight of (C), said mixture containing from 10 to 200 parts by weight of a mineral filler per 100 parts by weight of (A), and rubber vulcanizing ingredients in amount sufficient to vulcanize the mixture to the soft rubber state.

2. A shoe having a hard, smooth sole comprising a vulcanized uniform intimate mixture of (A) butadiene-styrene copolymer rubber containing from about 60 to about 95% by weight of butadiene and from about 40 to about 5% by weight of styrene both based on the total weight of said copolymer, (B) a graft copolymer-containing portion comprising by weight (1) 20 to 75 parts of a rubbery portion selected from the group consisting of poly-butadiene and copolymers of butadiene with up to 40% of styrene, and (2) correspondingly 80 to 25 parts of a styrene-acrylonitrile resin containing from 25 to less than 50% of styrene and correspondingly from 75 to more than 10% of acrylonitrile, at least a quarter of said styrene-acrylonitrile resin (2) in said graft copolymer-containing portion (B) having been introduced as the monomers into a pre-formed latex of said rubbery portion (1), and polymerized therein, whereby there is formed a graft copolymer of the styrene and acrylonitrile on the said rubbery portion (1), and (C) a resinous copolymer consisting of 86% by weight of styrene and 14% by weight of butadiene, the relative proportions of (A), (B) and (C) being 100 parts by weight of (A), 20-25 parts by weight of (B), and 20-25 parts by weight of (C), said mixture containing from 10 to 200 parts by weight of a mineral filler per 100 parts by weight of (A), and rubber vulcanizing ingredients in amount sufficient to vulcanize the mixture to the soft rubber state.

References Cited in the file of this patent

UNITED STATES PATENTS

| | | |
|---|---|---|
| 823,924 | Clark | June 19, 1906 |
| 1,090,535 | Hill | Mar. 17, 1914 |
| 1,164,860 | Piper | Dec. 21, 1915 |
| 1,800,405 | Rice | Apr. 14, 1931 |
| 2,437,030 | Hoza | Mar. 2, 1948 |
| 2,538,779 | Harrison | Jan. 23, 1951 |
| 2,578,218 | Ashworth | Dec. 11, 1951 |
| 2,600,461 | Backus | June 17, 1952 |
| 2,713,566 | Reid | July 19, 1955 |
| 2,755,270 | Hayes | July 17, 1956 |
| 2,802,808 | Hayes | Aug. 13, 1957 |

FOREIGN PATENTS

| | | |
|---|---|---|
| 476,704 | Canada | Sept. 4, 1951 |
| 499,577 | Canada | Jan. 26, 1954 |

OTHER REFERENCES

"Journal of Polymer Science," volume VIII, page 260 (1952).